U S005457774A

United States Patent [19]

Hori

[11] Patent Number: 5,457,774
[45] Date of Patent: Oct. 10, 1995

[54] BIT MAP DATA GENERATION APPARATUS

[75] Inventor: Takashi Hori, Nagano, Japan

[73] Assignee: Seiko Epson Corporation, Tokyo, Japan

[21] Appl. No.: 974,491

[22] Filed: Nov. 12, 1992

[30] Foreign Application Priority Data

Nov. 15, 1991 [JP] Japan .................................. 3-327130
Oct. 29, 1992 [JP] Japan .................................. 4-313940

[51] Int. Cl.$^6$ ............................ G06K 15/00; H04N 1/40
[52] U.S. Cl. ......................... 395/109; 395/108; 395/102
[58] Field of Search ....................................... 395/109, 108, 395/102, 101, 100, 139, 129, 150; 382/22, 47, 55

[56] References Cited

U.S. PATENT DOCUMENTS

| 4,953,027 | 8/1990 | Tong et al. | 348/569 |
| 5,091,973 | 2/1992 | Watanabe | 382/54 |
| 5,097,327 | 3/1992 | Hasebe | 348/25 |
| 5,270,728 | 12/1993 | Lund et al. | 347/5 |

FOREIGN PATENT DOCUMENTS

| 0284326 | 9/1988 | European Pat. Off. . |
| 62-212164 | 9/1987 | Japan . |

Primary Examiner—Raymond J. Bayerl
Assistant Examiner—Tracy M. Legree
Attorney, Agent, or Firm—Sughrue, Mion, Zinn, Macpeak & Seas

[57] ABSTRACT

Data at a current address and data preceding and succeeding the current address data are read out by bit data conversion means 11 for converting data received from contour data storing means 1 into bit map data. Left-side data reading means 21 reads data at the digit preceding the current address by one dot from the bit map data (or from print data which has been processed immediately before). Current data reading means 22 reads data at the digit of the current address. Right-side by one-dot data reading means 23 reads data at the digit succeeding the current address by one dot. Right-side by two-dot data reading means 24 reads data at the digit succeeding the current address by two dots. Using logical product operation means 27 and 28, logical product operations are performed between each pair of the data from the reading means 21 to 24 with one of each pair being inverted by data inversion means 25 and 26. The same process is performed for these operation results by data inversion means 30, and logical product operation means 31 and 32. The operation result is output to logical sum operation means 33 as print data. Thus, when there exists a series of an even number of dots continued in the row direction up to a contour point, two dots before the contour point are converted into blank dots (null dot data). The foregoing is especially advantageous in high-speed printing operations.

8 Claims, 7 Drawing Sheets

PRIOR ART

FIG. 9(b)

PRIOR ART

BIT MAP DATA GENERATION APPARATUS

BACKGROUND OF THE INVENTION

1. Field of the Invention

The present invention relates to a bit map data generation apparatus for generating bit map data which is particularly suitable for a serial printer-using a wire dot type recording head, from an outline font, and more particularly to a technique of a half-dot protect process.

2. Prior Art

In an outline font, data indicative of a character or a figure are stored in the form of its contour line. Since the amount of the data is much smaller than that of bit map data, an outline font is widely used in a printer which requires a high print quality.

Such an outline font should be once converted into bit map data during a printing process. Especially, in a wire dot type recording head, a high-speed operation can be attained by printing only every other dot of adjoining dots in the row direction. Therefore, it is necessary to perform a half-dot protect process to thin out the data in which every other bit in the row direction is surpassed from being printed.

Figure 9A:
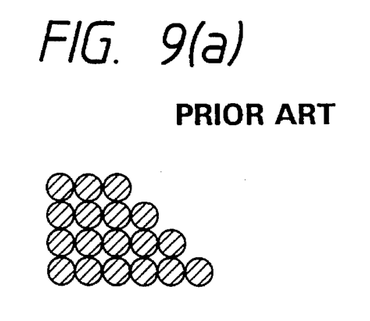
FIGS. 9(A) and 9(B) are diagrams respectively showing bit map data before performing a half-dot protect process, and bit map data after performing the half-dot protect process according to a conventional method.
Figure 9B:
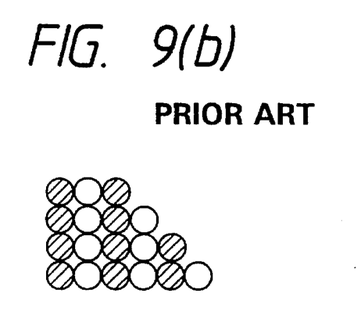

In such a process, generally, every other dot is mechanically thinned out by a logical circuit. This gives rise to a problem in the case wherein an even number of dots adjoin one another in the row direction. Namely, among dots constituting a character or pattern, dots in the contour portion are thinned out as shown in FIGS. 9(A) and 9(B), with the result that the contour of the printed character or pattern is unclear.

SUMMARY OF THE INVENTION

The invention has been developed in view of this problem. An object of the invention is to provide a novel bit map data generation apparatus which, irrespective of a half-dot protect process, can dependably preserve dots constituting a contour portion, thereby preventing the print quality from being degraded.

In order to solve the above-mentioned problem, the bit map data generation apparatus of the invention comprises: means for converting data retrieved from a contour data storing means into bit map data; first reading means for reading data preceding a current address by one dot from said converting means or print data which has been processed immediately before; second reading means for reading data at the current address from said converting means; third reading means for reading data succeeding the current address by one dot from said converting means; and fourth reading means for reading data succeeding the current address by two dots from said converting means; first data inversion means for outputting data which is the inversion of said data preceding the current address by one dot; second data inversion means for outputting data which is the inversion of said data succeeding the current address by two dots; first logical product operation means for performing a logical product operation between data from said first data inversion means and data from said second reading means; second logical product operation means for performing a logical product operation between data from said third reading means and data from said second data inversion means; third data inversion means for outputting data which is the inversion of said data from said third reading means; fourth data inversion means for outputting data which is the inversion of data from said second logical product operation means; third logical product operation means for performing a logical product operation between data from said first logical product operation means and data from said fourth inversion means; fourth logical product operation means for performing a logical product operation between data from said second reading means and data from said third data inversion means; and logical sum operation means for performing a logical sum operation between data from said third and fourth logical product operation means to produce print data to be output onto a print head and fed back onto said first reading means.

The first to fourth reading means obtain data of four adjoining bits in the printing direction, at a current address, an address preceding the current address by one bit, and addresses succeeding the current address by one bit and two bits. Among bits constituting a contour portion, two consecutive data "1" which precede data "1" at the forward end of a series of an even number of data "1" in the printing direction are converted into two data "0". In this way, a half-dot protect process is performed, so that dot data constituting at least right and left portions of the contour are prevented from disappearing.

DETAILED DESCRIPTION OF THE PREFERRED EMBODIMENTS

The invention will be described in detail by describing the embodiment illustrated in the figures.

Figure 2:
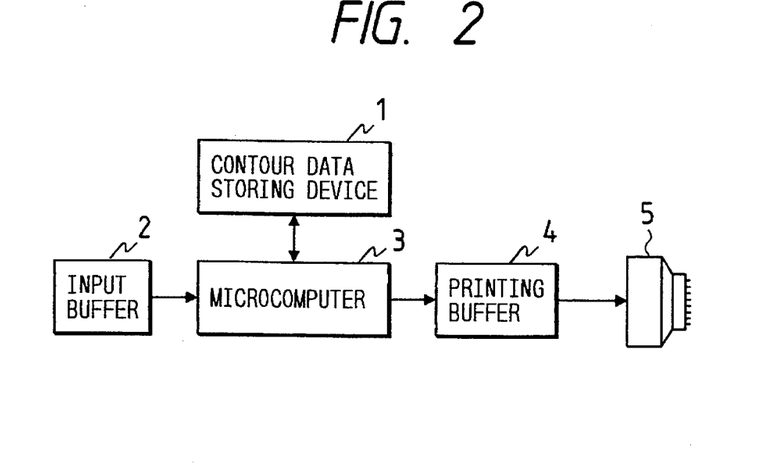
FIG. 2 is a block diagram showing the embodiment of the invention.

FIG. 2 shows an embodiment of the invention. In FIG. 2, reference numeral 1 denotes a contour data storing device. The contour data storing device 1 stores contour data which represent the contour line of a character or a pattern, correspondingly to a character code. The contour data consist of a combination of X coordinate values and Y coordinate values of reference points, i.e., starting points and end points of a plurality of lines which represent the number of data and a pattern, and line type data that specify the type of line joining the starting point and the end point with each other, e.g., a straight line or a parabola.

Reference numeral 3 denotes a microcomputer which constitutes a bit map data generation apparatus. The microcomputer 3 is so programmed as to output bit map data in accordance with a character code and attribute data in an input buffer 2 to a printing head 5 through a printing buffer 4.

Figure 1:
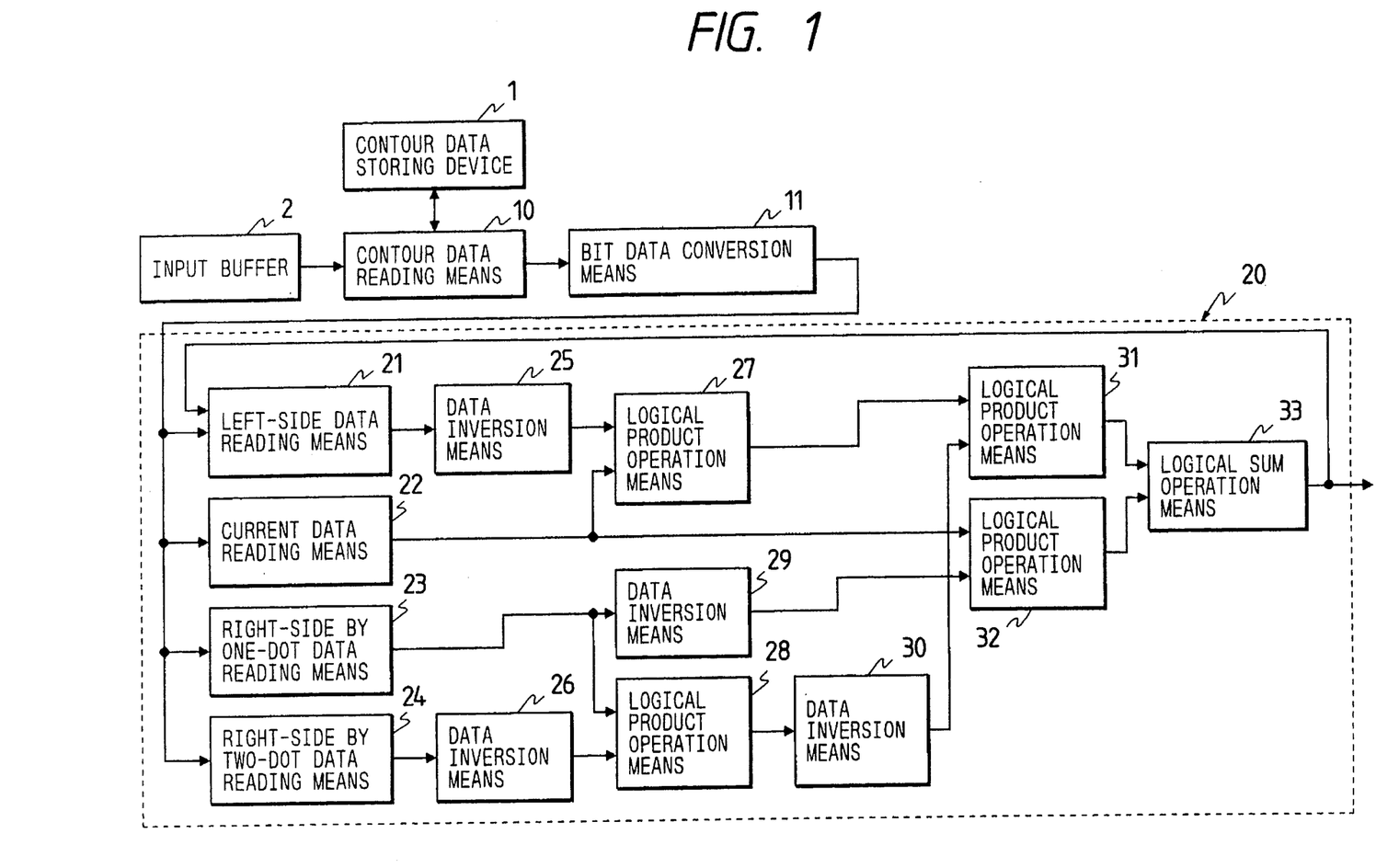
FIG. 1 is a block diagram showing an embodiment of the invention as functions to be effected by a microcomputer.

FIG. 1 is a block diagram showing functions to be performed by the above-mentioned microcomputer 3. In FIG. 1, reference numeral 10 denotes contour data reading means which accesses the contour data storing device 1 based on the character code in the input buffer 2, and outputs contour data. Reference numeral 11 denotes bit data conversion means. In this embodiment, a contour line is represented by bits. The bit data conversion means 11 is so constructed that logical operations are sequentially performed for the bits in the main scanning direction, so that data "1" is generated in the area surrounded by the contour line.

Reference numeral 20 denotes half-dot protect process means which is a feature of the invention. The half-dot protect process means 20 is so programmed as to realize the following means: left-side data reading means 21 for reading bit data on the left side of a current address by one bit based on the bit data produced by the bit conversion means 11, or print data which has been processed immediately before; current data reading means 22 for reading data at the current address; right-side by one-dot data reading means 23 for reading data on the right side of the current address by one bit; right-side by two-dot data reading means 24 for reading data on the right side of the current address by two bits; data inversion means 25 and 26 for respectively inverting data from the left-side data reading means 21 and the right-side by two-dot data reading means 24; logical product operation means 27 for performing a logical product operation between data from the data inversion means 25 and data from the current data reading means 22; logical product operation means 28 for performing a logical product operation between data from the right-side by one-dot data reading means 23 and data from the data inversion means 26; data inversion means 29 for inverting data from the right-side by one-dot data reading means 23; data inversion means 30 for inverting data from the logical product operation means 28; logical product operation means 31 for performing a logical product operation between data from the data inversion means 30 and data from the logical product operation means 27; logical product operation means 32 for performing a logical product operation between data from the current data reading means 22 and data from the data inversion means 29; and logical sum operation means 33 for performing a logical sum operation between data from the logical product operation means 31 and data from the logical product operation means 32 to output print data onto a print head and the left-side data reading means 21. As a result, the truth values shown in Table 1 below are produced.

TABLE 1

| | Left-side data | Data of current address | Right-side by one-dot data | Right-side by two-dot data | Judgment |
|---|---|---|---|---|---|
| 1 | ● | ● | ● | ● | ○ |
| 2 | ● | ● | ● | ○ | ○ |
| 3 | ● | ● | ○ | ● | ● |
| 4 | ● | ● | ○ | ○ | ○ |
| 5 | ● | ○ | ● | ● | ○ |
| 6 | ● | ○ | ● | ○ | ○ |
| 7 | ● | ○ | ○ | ● | ○ |
| 8 | ● | ○ | ○ | ○ | ○ |
| 9 | ○ | ● | ● | ● | ● |
| 10 | ○ | ● | ● | ○ | ○ |
| 11 | ○ | ● | ○ | ● | ● |
| 12 | ○ | ● | ○ | ○ | ● |
| 13 | ○ | ○ | ● | ● | ○ |
| 14 | ○ | ○ | ● | ○ | ○ |
| 15 | ○ | ○ | ○ | ● | ○ |
| 16 | ○ | ○ | ○ | ○ | ○ |

The operation result at No. 3 should properly be 0, but is ●. However, since the process is sequentially performed from the left, the operation result becomes 0 when the process proceeds to No. 10. Therefore, in fact, the operation result shown at No. 3 cannot be obtained.

Figure 4:
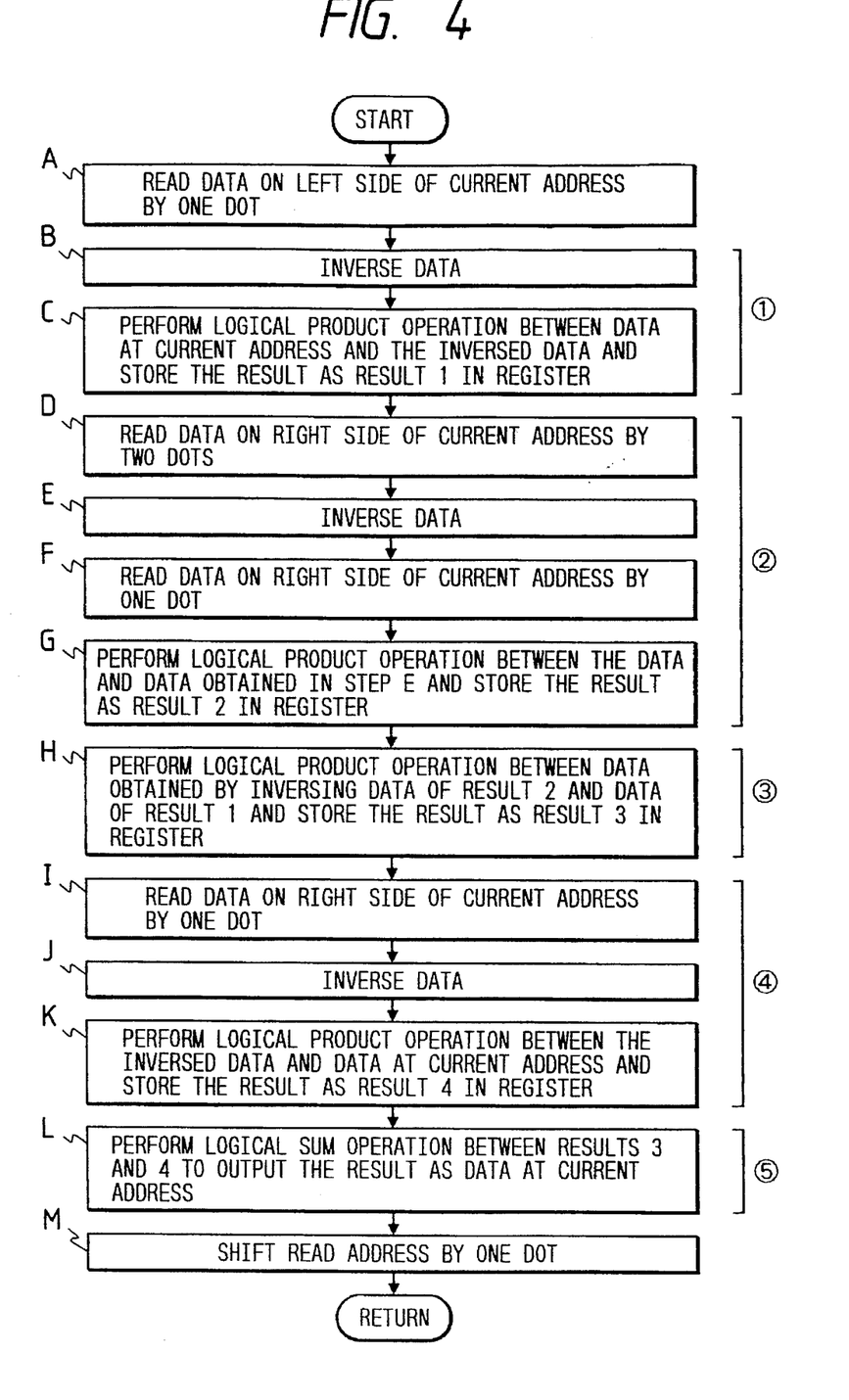
FIG. 4 is a flowchart showing the operation of the apparatus.

Hereinafter, the operation of the device having the above-mentioned configuration will be described with reference to the flowchart shown in FIG. 4.

When a printing instruction is output, the contour data reading means 10 reads a character code stored in the input buffer 2 and magnification data associated with the data, and then reads out contour data corresponding to the character code, from the contour data storing device 1. When the outline font corresponding to the character code stored in the input buffer 2 is converted into bit map data in this way, data in the column direction at the address on the left side of the current address by one dot are read (step A). These data are inverted and then temporarily stored (step B). Logical product operations are performed between the data at the current address and the inverted data which are temporarily stored, and the operation result is temporarily stored as result 1 (step C).

Thereafter, data in the column direction at the address on the right side of the current address by two dots are read (step D). These data are inverted and then temporarily stored (step E). Thereafter, data in the column direction at the address on the right side of the current address by one dot are read (step F). Logical product operations are performed between the data and the inverted data obtained in step E, and the operation result is temporarily stored as result 2 (step G).

Logical product operations are performed between data obtained by inverting the data of result 2 which are temporarily stored and the data of result 1 obtained in step C, and the operation result is temporarily stored as result 3 (step H).

Then, data in the column direction at the address on the right side of the current address by one dot are read (step I). These data are inverted to obtain the inversions thereof (step J). Logical product operations are performed between the inverted data and data in the column direction at the current address, and the operation result is temporarily stored as result 4 (step K).

Logical sum operations are performed between the data of result 3 obtained in step H and the data of result 4 obtained in step K, and the result is output as printing data for the current address (step L).

When the printing bit data for the current address are output, the address from which data is to be read is shifted by one dot in the printing direction (in this embodiment in the right direction) (step M). The foregoing steps beginning with step A are repeated, whereby the half-dot protect process is executed on the bit map data produced by the bit conversion means 11. Thus, in the above-described process, when data to be currently processed is on or after the second column, data preceding the current address by one bit is directed to print data which has been converted immediately before.

Figure 3A:
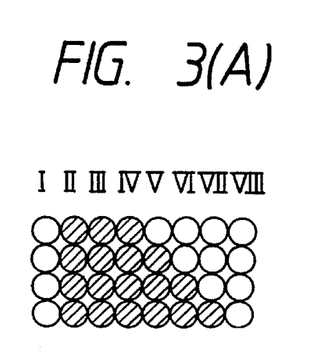
FIGS. 3(A) and 3(B) are diagrams respectively showing bit map data before the conversion performed by the apparatus, and bit map data after the conversion.

FIGS. 5 to 8 show the above-mentioned operation process steps. The figures illustrate an exemplary case where an outline font to be printed is converted by the bit data conversion means 11 into bit map data having a size of 4 bits by 8 bits as shown in FIG. 3(A). In FIGS. 3(A), 3(B) and 5 to 8, each of the Roman numerals I to VIII indicates a transition of the current address.

Figure 3B:
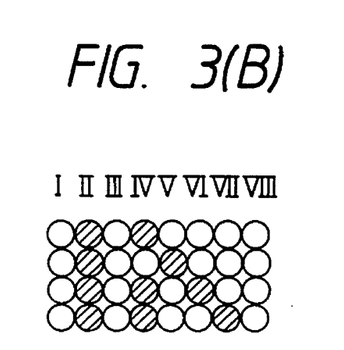
Figure 5:
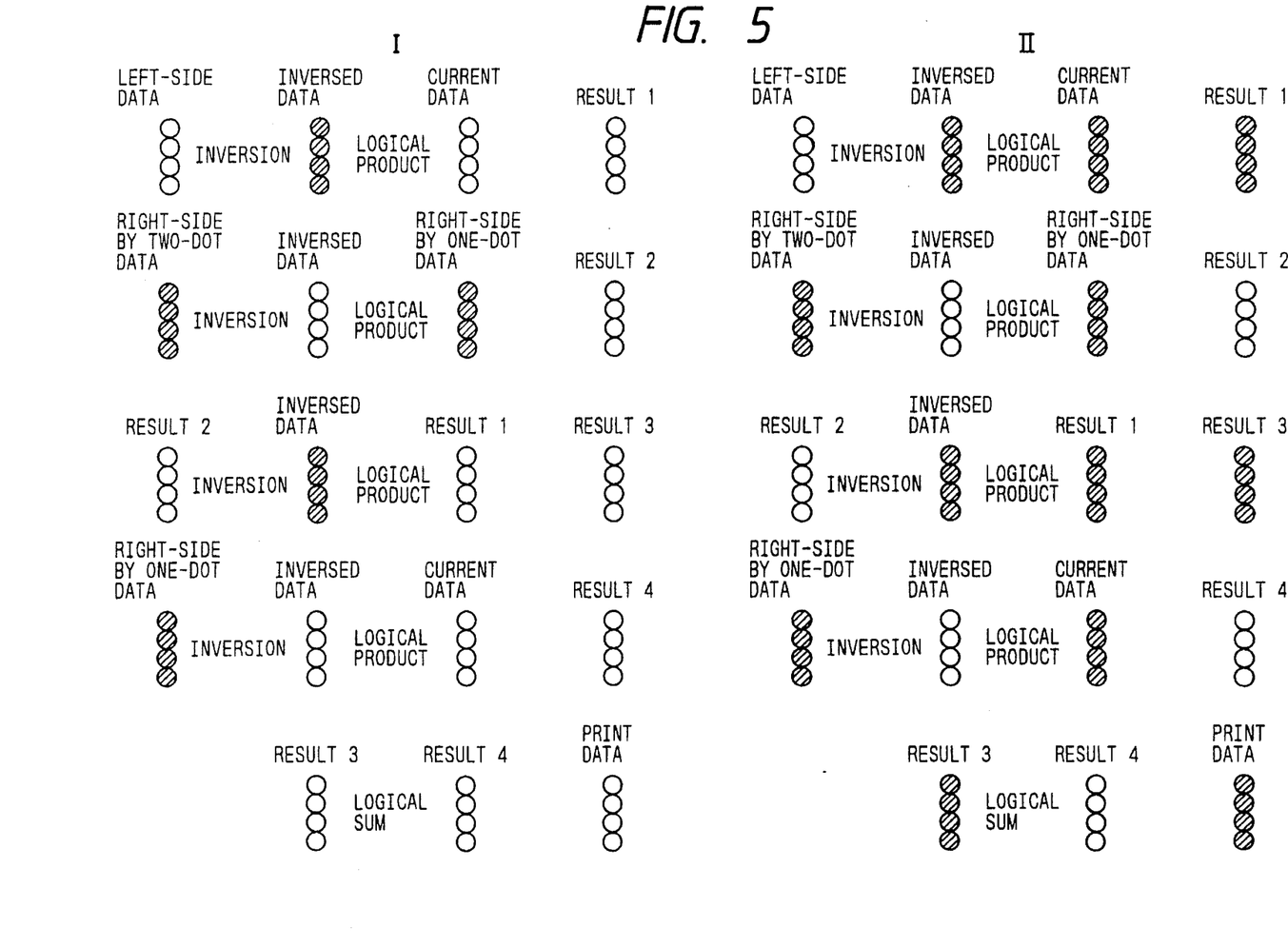
FIG. 5 is a diagram showing operation processes I and II in the apparatus.

The bit data constituting the column I in FIG. 3(A) are all "0", so that data "1" are output for all four bits as a result of the operation process shown in I of FIG. 5 (I in of FIG. 3(B)).

Next, the current address is shifted to the right by one bit, so that the column II in FIG. 3(A) is to be processed. Data "1" are output for all four bits as a result of the operation process shown in II of FIG. 5, while reading print data which has been produced by the operation process shown in I of FIG. 5. This means that the bit data are converted into the data preserving the left-side contour (II in FIG. 3(B)).

The current address is further shifted to the right by one bit, so that the column III is to be processed. The bit data for all four bits are converted into data "0" as a result of the operation process shown in III of FIG. 6. Accordingly, data which have been subjected to the half-dot protect process are produced (III in FIG. 3(B)).

Figure 6:
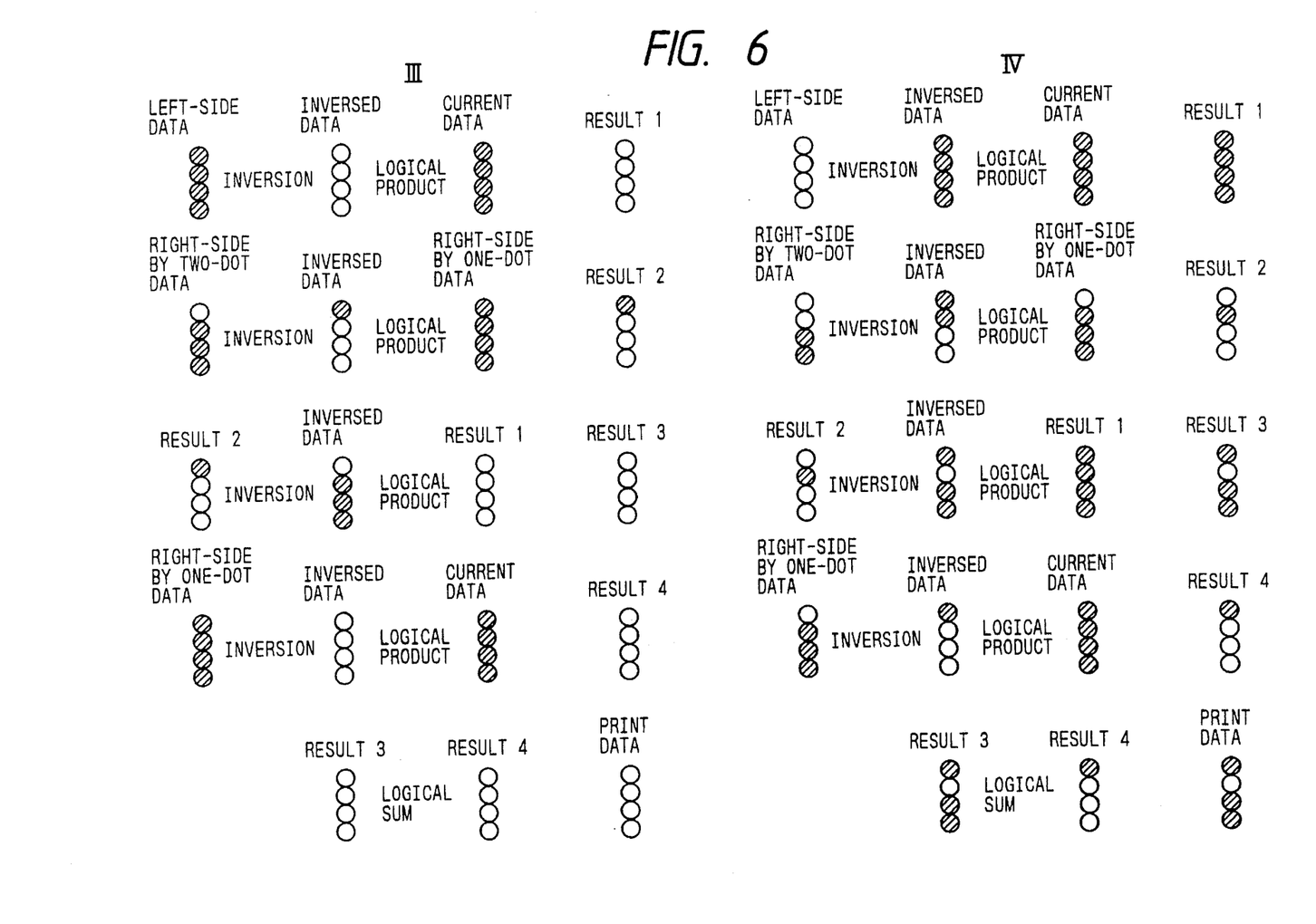
FIG. 6 is a diagram showing operation processes III and IV in the apparatus.

When the column IV is to be processed, the operation process shown in IV of FIG. 6 is performed. According to this process, a data set in which the second bit from the top is "0" and the other bits are "1" is output, while reading all the print data which have been converted into "0" by the calculation made immediately before. As a result, the bit in the first row (the uppermost line in the figure) forming the contour is output to be "1" which is the same as the original data, thereby preserving the contour portion. The dot in the second row from the top in the figure and adjacent to the dot of the contour portion is converted into data "0" which is the same as in the column III.

Then, the object to be processed is shifted to the column V. Similarly, print data including data "0" in the second row which has been converted by the calculation made immediately before is read. As a result of the operation process shown in V of FIG. 7, the bit in the second row which constitutes the contour portion is output as data "1". The bit preceding (in this embodiment, on the left side) by one bit with respect to the bit which constitutes the contour portion in the next column VI is converted into data "0".

Figure 7:
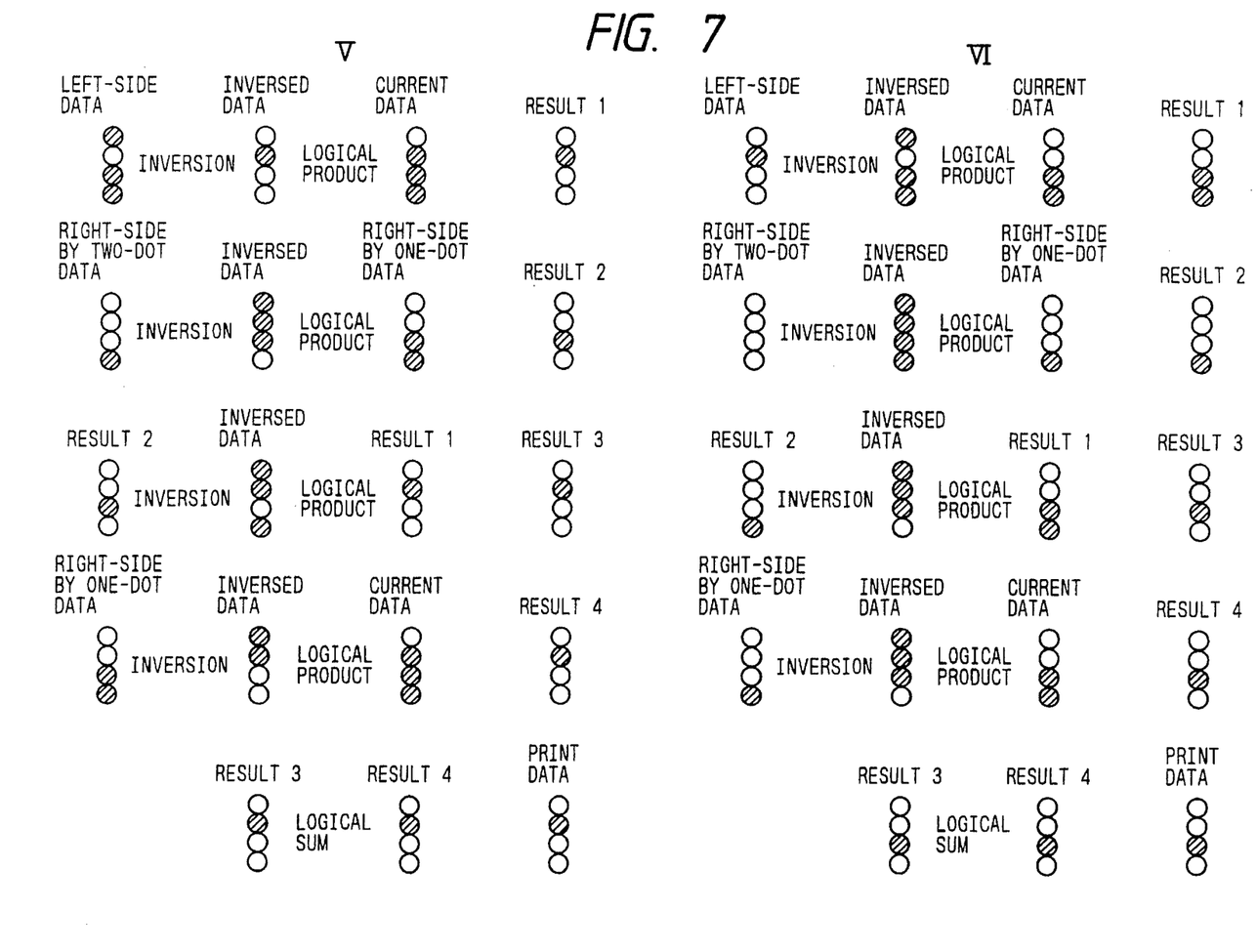
FIG. 7 is a diagram showing operation processes V and VI in the apparatus.
Figure 8:
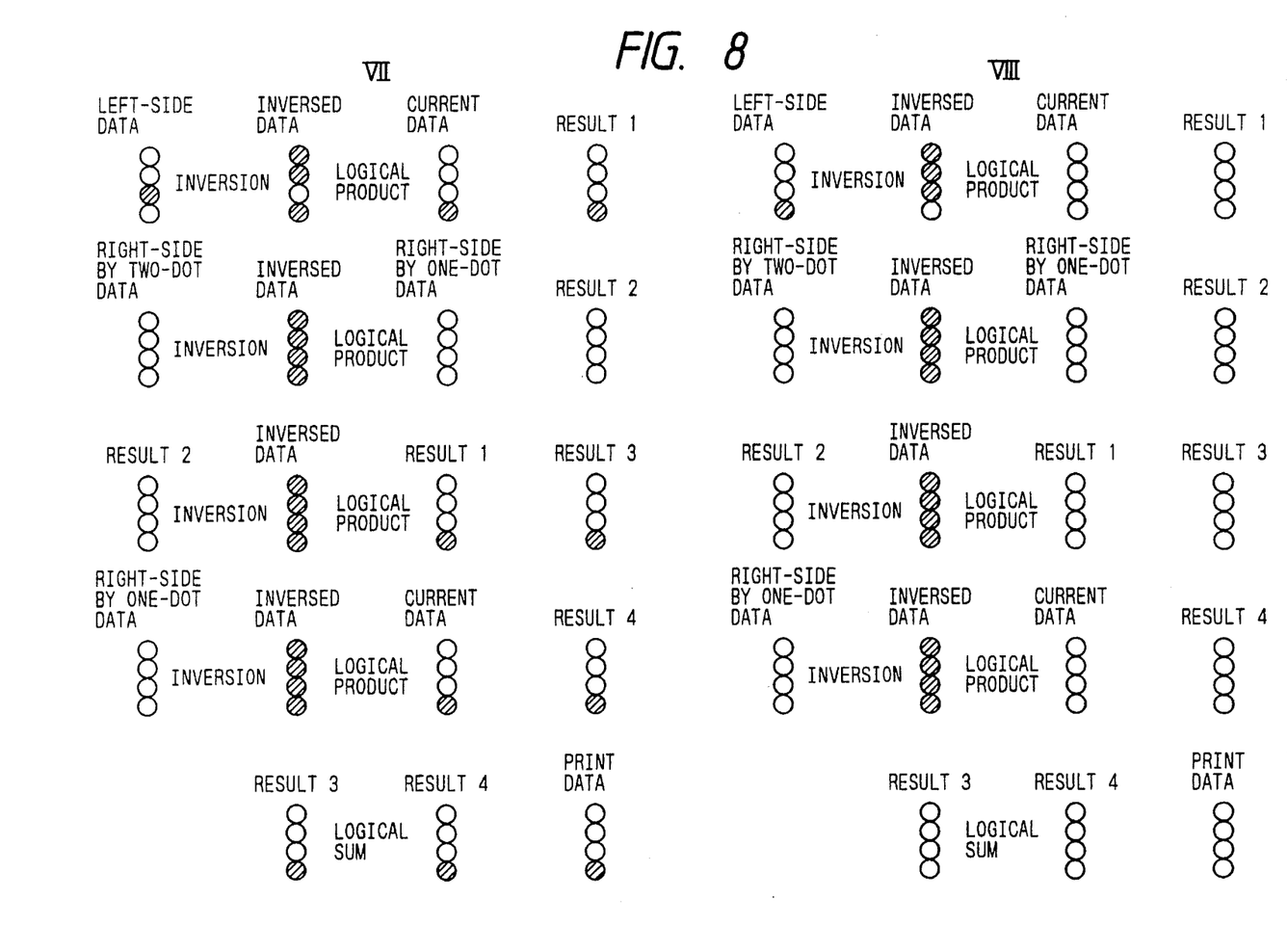
FIG. 8 is a diagram showing operation processes VII and VIII in the apparatus.

Thereafter, the processes shown in VI of FIG. 7 and in VII and VIII of FIG. 8 are performed. If there is a series of an odd number of data "1" which continues from one end (in this embodiment, the left end), the bit data are converted into data "0" at every other column so as to thin out alternate bits. If there is a series of an even number of "1" data, a bit map pattern is produced in which two bits preceding the other end (in this embodiment, the right end) are converted into "0", and the bit at the other end portion is converted into "1" data.

As a result, even in a portion where an even number of dots is found, a half-dot protect process can be executed without causing dots in the contour portion to disappear. In other words, an edge is constituted by four dots including data succeeding the current address by one dot and two dots, and data preceding the current address by one dot, so that it is possible to prevent dots constituting the contour portion from being thinned out in performing the half-dot protect process.

In the embodiment described above, printing is performed in the direction from left to right. It will be appreciated by those skilled in the art that, in a case where the printing is performed in the direction from the right to the left, the sampling of bit map data for an operation process is started at the right side, whereby the same effects are achieved.

As described above, in this invention, the first to fourth reading means obtain data of four columns in total: data at the current address; data preceding it by one bit or print data which has been processed immediated before; and data succeeding it by one bit and two bits. Then, the half-dot protect process is performed in such a manner that, in a series of an even number of "1" data and among the bits constituting the contour portion, the two "1" data preceding "1" data of the forward end in the printing direction are converted into "0" data. Therefore, the half-dot protect process can be performed without causing the dots which constitute the left and right contour lines to disappear, whereby the print quality can be prevented from being degraded.

What is claimed is:

1. An apparatus for generating bit map data, comprising:

means for storing contour data;

means for converting data retrieved from said contour data storing means into bit map data; and first reading means for reading data preceding a current address by one dot;

second reading means for reading data at a current address from said converting means;

third reading means for reading data succeeding the current address by one dot address from said converting means;

fourth reading means for reading data succeeding the current address by two dot addresses from said converting means;

first data inversion means for inverting data from said first reading means;

second data inversion means for inverting data from said fourth reading means;

first logical product operation means for performing a logical product operation between data from said first data inversion means and data from said second reading means;

second logical product operation means for performing a logical product operation between data from said third reading means and data from said second data inversion means;

third data inversion means for inverting data from said third reading means;

fourth data inversion means for inverting data from said second logical product operation means;

third logical product operation means for performing a logical product operation between data from said first logical product operation means and data from said fourth inversion means;

fourth logical product operation means for performing a logical product operation between data from said second reading means and data from said third data inversion means; and logical sum operation means for performing a logical sum operation between data from said third and said fourth logical product operation means, to produce print data to be output to a print head.

2. An apparatus as claimed in claim 1, further comprising:

input buffer means for storing a character code;

contour data reading means for accessing said contour data storing means based on the character code retrieved from said input buffer means, to output contour data to said converting means.

3. An apparatus as claimed in claim 1, wherein, when data to be processed currently is initial data, then said first reading means reads data preceding the current address by one dot from said converting means, and when data to be processed currently is not initial data, then said first reading means reads the print data output from said logical sum operation means.

4. An apparatus as claimed in claim 1, wherein the data read by said first reading means is read by said first reading means from said converting means.

5. An apparatus as claimed in claim 1, wherein the data read by said first reading means is read by said first reading means from a feedback loop which supplies the print data output by said logical sum operation means to said first reading means as the data preceding the current address by one dot.

6. A method of processing binary bit map data which thins out the bit map data according to a half-dot protect process while preserving contours of a character defined by the bit map data, said method comprising the steps of:

(a) reading bit map data defining four consecutive dots of print data, to provide first, second, third and fourth read data, respectively;

(b) inverting the first read data, the third read data and the fourth read data, to provide inverted first data, inverted third data and inverted fourth data, respectively;

(c) performing a logical product operation between the inverted first data and the second read data, to provide a first result;

(d) performing a logical product operation between the third read data and the inverted fourth data, to provide a second result;

(e) inverting the second result to provide an inverted second result;

(f) performing a logical product operation between the first result and the inverted second result, to provide a third result;

(g) performing a logical product operation between the second read data and the inverted third data, to provide a fourth result;

(h) performing a logical sum operation between the third result and the fourth result, to provide a print data output to replace the bit map data defining a second of the four consecutive dots; and (i) outputting the print data output to a print head as printing data.

7. The method according to claim 6, further comprising the step of:

repeating said steps (a) to (i) for four additional consecutive dots, whereby the four additional consecutive dots are shifted relative to the four consecutive dots by one dot address.

8. The method according to claim 7, wherein, prior to performing said step of repeating said steps (a) to (i), the print data output is supplied as the bit map data defining a first of the four additional consecutive dots.

* * * * *